United States Patent
Wu (10) Patent No.: US 7,182,094 B2
(45) Date of Patent: Feb. 27, 2007

(54) AIR NOZZLE FOR INFLATING CUSHION

(76) Inventor: Scott Wu, No. 6, Lane 176, Wu Fu Road, Wu Feng Hsiang, Taichung Hsien (TW)

( * ) Notice: Subject to any disclaimer, the term of this patent is extended or adjusted under 35 U.S.C. 154(b) by 189 days.

(21) Appl. No.: 10/844,210

(22) Filed: May 12, 2004

(65) Prior Publication Data

US 2005/0252550 A1 Nov. 17, 2005

(51) Int. Cl.
*F16K 15/20* (2006.01)
(52) U.S. Cl. .................. 137/231; 251/148; 251/237
(58) Field of Classification Search ........... 137/231; 251/149.4, 149.6, 148, 231, 274; 285/387–389
See application file for complete search history.

(56) References Cited

U.S. PATENT DOCUMENTS

| 2,270,932 | A | * | 1/1942 | Cornelius | 251/231 |
| 3,142,328 | A | * | 7/1964 | Iknayan et al. | 137/231 |
| 3,423,064 | A | * | 1/1969 | Schmaus et al. | 251/214 |
| 3,794,290 | A | * | 2/1974 | Huszar | 251/347 |
| 3,807,687 | A | * | 4/1974 | Thompson | 251/149.4 |
| 4,017,057 | A | * | 4/1977 | Strybel | 251/149.1 |
| 4,784,412 | A | * | 11/1988 | Van Dongen | 285/387 |
| 5,470,044 | A | * | 11/1995 | Chi | 251/231 |
| 6,105,600 | A | * | 8/2000 | Wang | 137/231 |
| 6,557,905 | B2 | * | 5/2003 | Mack et al. | 285/387 |
| 6,786,247 | B1 | * | 9/2004 | Kemppainen et al. | 137/231 |

* cited by examiner

*Primary Examiner*—Eric Keasel
*Assistant Examiner*—Cloud Lee
(74) *Attorney, Agent, or Firm*—Alan D. Kamrath; Nikolai & Mersereau, P.A.

(57) ABSTRACT

A nozzle through which air can be pumped into a cushion from a pump includes a housing with a passage extending therein and a space intersecting the passage. A core is put in the space in a sealing and sliding manner for pushing a valve installed in the cushion. The core defines a space. A peripheral hole through which the core communicates the space of the core with the space of the housing. A tubular lip is installed on the housing in a sealing and rotating manner. The tubular lip includes a thread formed on an internal face for engagement with a thread formed on the cushion. A control element includes a cam installed pivotally on the housing for pushing the core and a lever extending from the cam for rotating the cam.

8 Claims, 8 Drawing Sheets

AIR NOZZLE FOR INFLATING CUSHION

FIELD OF INVENTION

The present invention relates to a nozzle via which air can be pumped into a cushion from a pump.

BACKGROUND OF INVENTION

Figure 8:
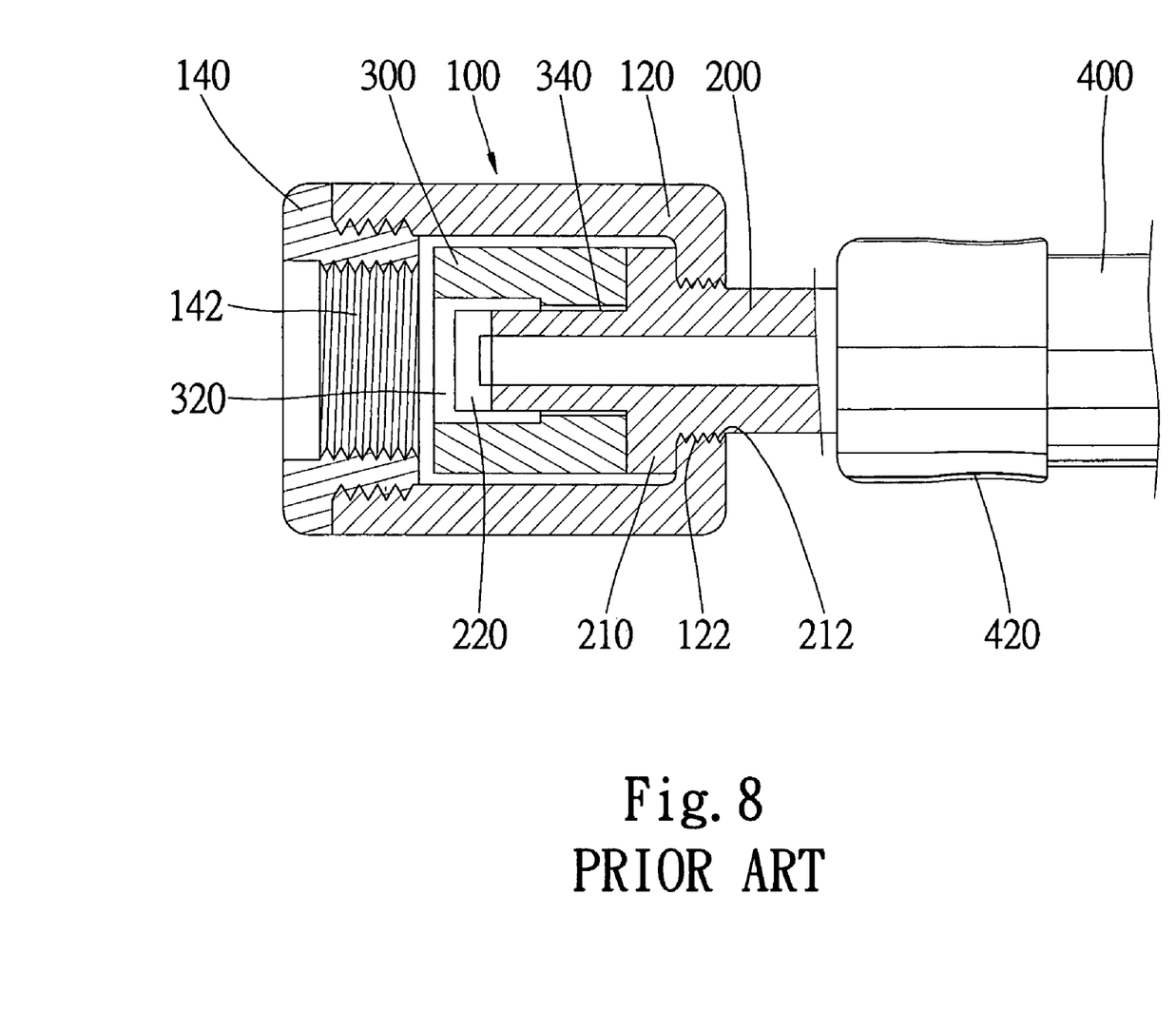
FIG. 8 is a cross-sectional view of a conventional nozzle.

FIG. 8 shows a conventional nozzle through which air can be pumped into a cushion (not shown) from a pump (not shown). The cushion includes a tube and a valve installed in the tube. A thread is formed on an internal face of the tube.

The nozzle comprises a housing 100, a tube 200 and a tubular seal 300. The housing 100 comprises an annular portion and a cylindrical portion 120 extending from the annular portion. A thread 122 is formed on the annular portion of the housing 100.

The tube 200 includes a first section inserted through the annular portion of the housing 100, a second section put in the housing 100 and an annular flange 210 formed between the first and second sections of the tube 200 for abutment against the annular portion of the housing 100. The first section of the tube 200 is inserted in a pipe 400 leading to a pump (not shown). A thread 212 is formed on the first section of the tube 200 for engagement with the thread 122 formed on the annular portion of the housing 100. A ferrule 420 is put around the pipe 400 in order to keep the first section of the tube 200 in the pipe 400. Pushers 220 are formed at the second section of the tube 200. The pushers 220 leave the second section of the tube 200 open.

The tubular seal, 300 is put around the second section of the tube 200. The tubular seal 300 defines a big hole 320 and a small hole 340 communicated with the big hole 320. A portion of a tubular lip 140 is screwed in the cylindrical portion 120 of the housing 100. A thread 142 is formed on an internal face of the tubular lip 140.

To pump air, a user rotates the housing 100 so as to rotate the tubular lip 140 in order to engage the thread 142 of the tubular lip 140 with the thread formed on the tube of the cushion. Now, the valve of the cushion is pushed by the pushers 220 so that air flows through the tube of the cushion. The user rotates the tube 200. Because of the engagement of the thread 212 with the thread 122, the tube 200 is moved towards the tube of the cushion. The tubular seal 300 will also be moved to the tube of the cushion and seal the same. The pressurized air can be pumped into the cushion from the pump. However, much air has escaped from the cushion after the valve installed in the tube of the cushion is pushed by the pushers 220 before the tube of the cushion is sealed by the tubular seal 300. In addition, it takes quite some time to rotate the tube 200 in order to use the seal 300 to seal the tube extending from the cushion.

The present invention is therefore intended to obviate or at least alleviate the problems encountered in the prior art.

SUMMARY OF INVENTION

It is an objective of the present invention to provide a nozzle that allows only a little air to leak from an object to be pumped.

It is another objective of the present invention to provide a nozzle that can be operated easily.

According to the present invention, a nozzle is disclosed through which air can be pumped into a cushion from a pump. The nozzle includes a housing with a passage extending therein and a space intersecting the passage. A core is put in the space in a sealing and sliding manner for pushing a valve installed in the cushion. The core defines a space, a peripheral hole through which the space thereof is communicated with the space of the housing. A tubular lip is installed on the housing in a sealing and rotating manner. The tubular lip includes a thread formed on an internal face for engagement with a thread formed on the cushion. A control element includes a cam installed pivotally on the housing for pushing the core and a lever extending from the cam for rotating the cam.

The other advantages, objectives and features of the present invention will be described in the following.

BRIEF DESCRIPTION OF DRAWINGS

The present invention will be described via detailed illustration of two embodiments referring to the drawings.

DETAILED DESCRIPTION OF EMBODIMENTS

FIGS. 1 to 5 show a nozzle according to a first embodiment of the present invention. Via the nozzle, air can be pumped into a cushion 80 from a pump (not shown).

Figure 1:
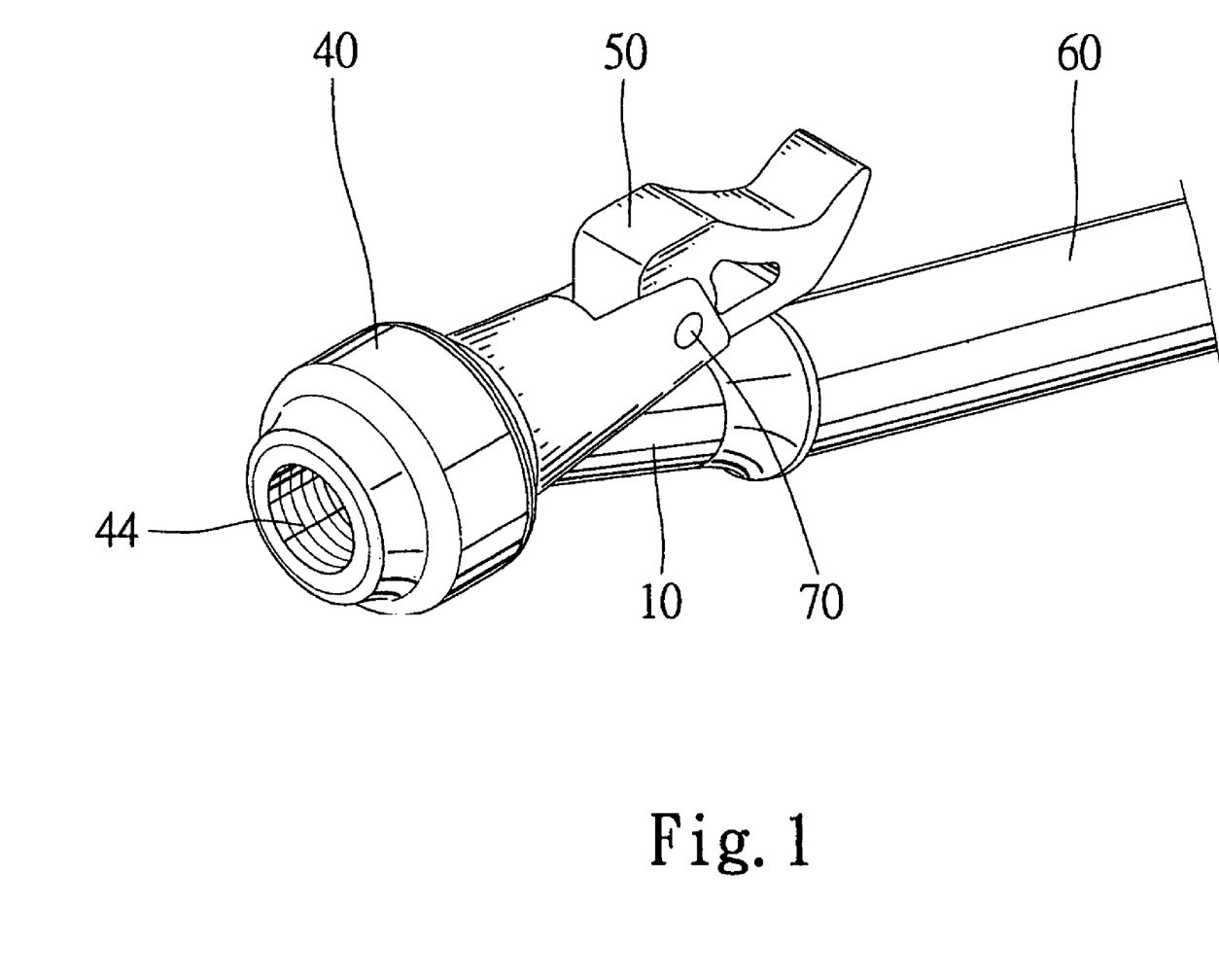
FIG. 1 is a perspective view of a nozzle according to a first embodiment of the present invention.
Figure 2:
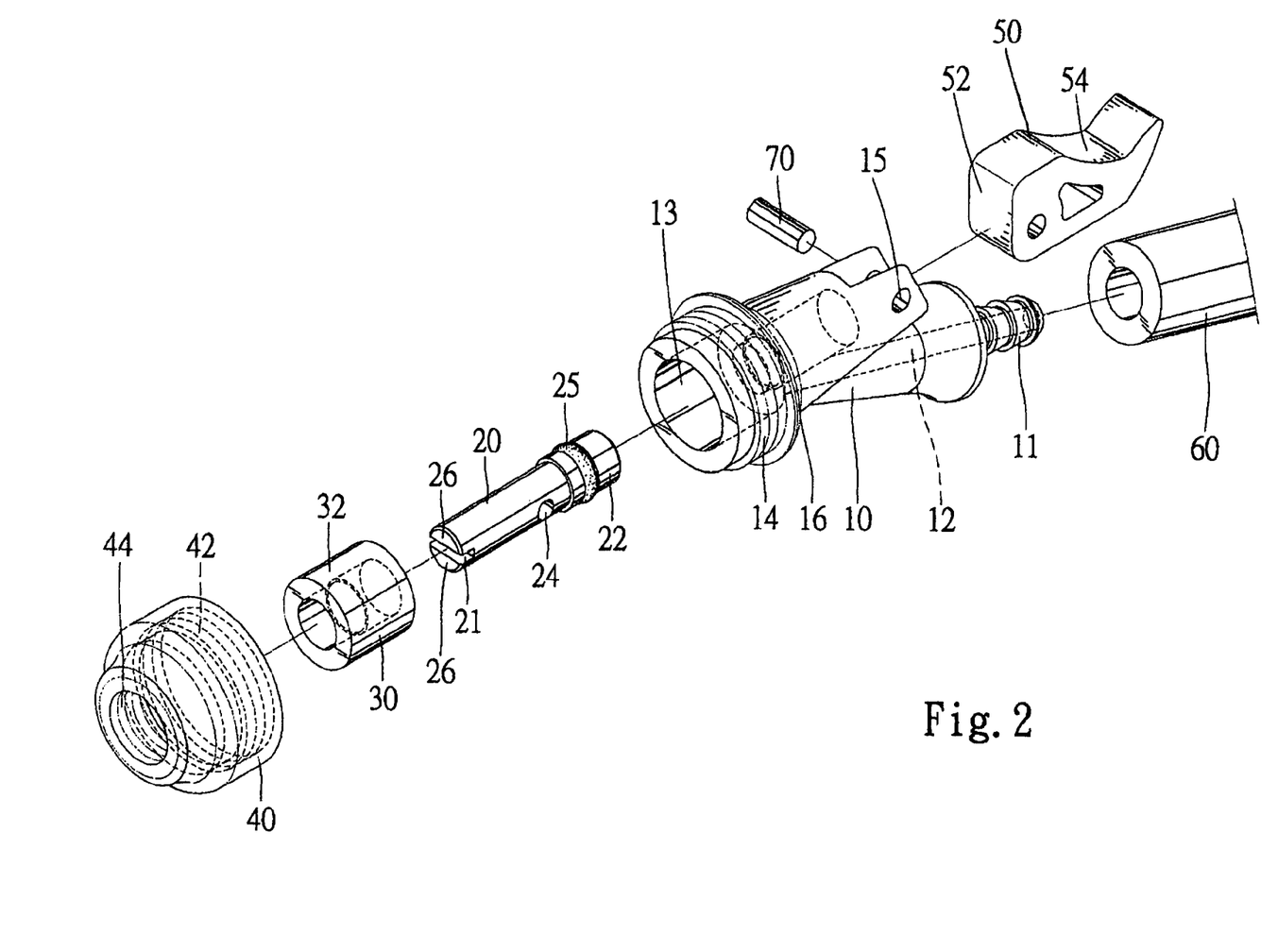
FIG. 2 is an exploded view of the nozzle of FIG. 1.
Figure 3:
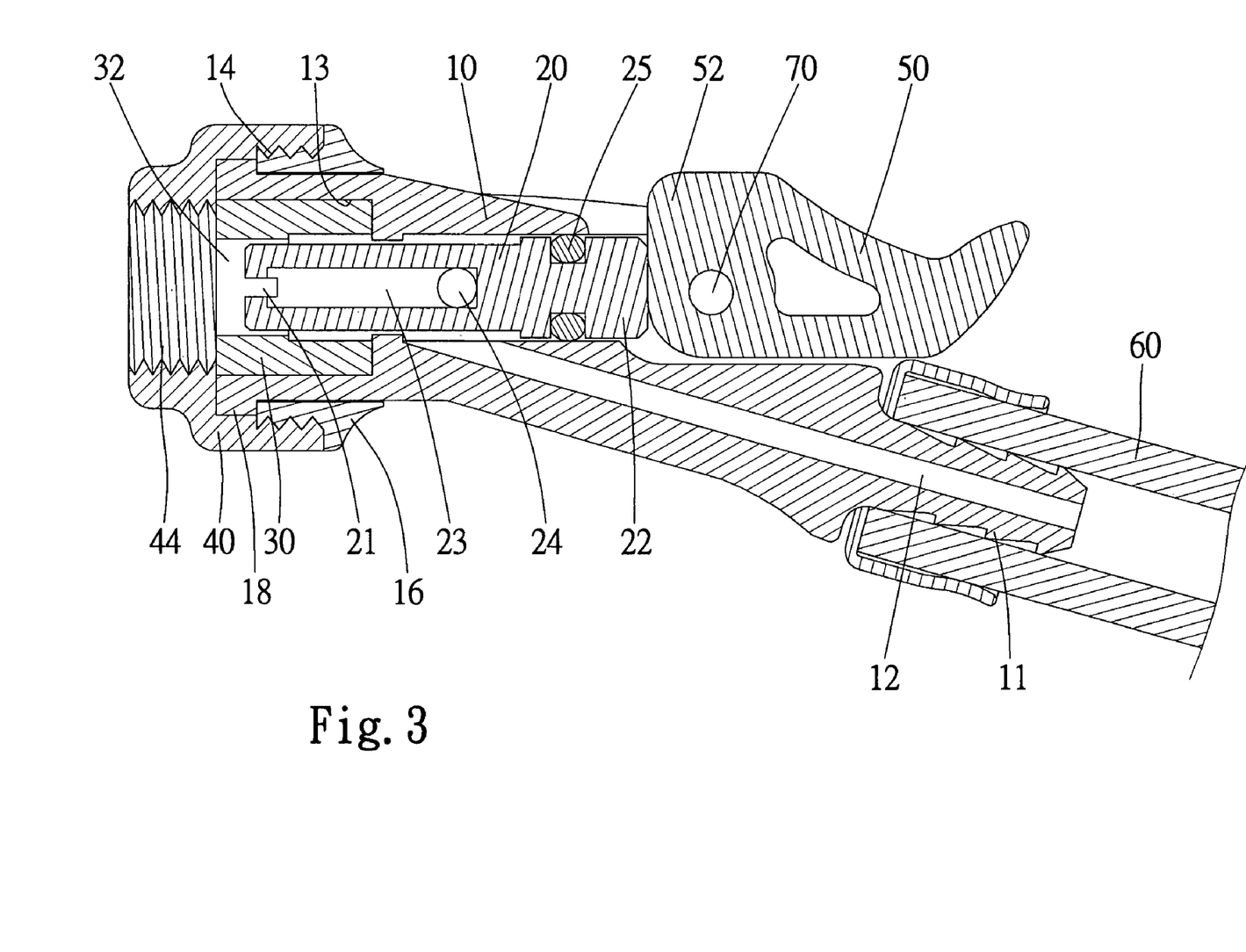
FIG. 3 is a cross-section of the nozzle of FIG. 1.

Referring to FIGS. 2 and 3, the nozzle includes a housing 10, a core 20, a tubular seal 30, a tubular lip 40 and a control element 50.

The housing 10 includes a first tubular portion and a second tubular portion from which the first tubular portion extends obliquely. A free end of the first tubular portion of the housing 10 is formed as a joint 11. The joint 11 is inserted in a pipe 60 leading to a pump (not shown). The first tubular portion of the housing 10 defines a passage 12. Two lugs 15 are formed at a first end of the second tubular portion of the housing 10. An annular flange 18 is formed at a second end of the second tubular portion of the housing 10. The second tubular portion of the housing 10 defines a space 13 including a first section and a second section larger than the first section. The first section of the space 13 is communicated with the passage 12. A thread 14 is formed on an external face of a collar 16.

The core 20 includes a first end and a second end. A head 22 is formed at the first end of the core 20. An O-ring 25 is installed on the head 22. A slot 21 is defined between two pushers 26 formed at the second end of the core 20. The core 20 defines a passage 23 communicated with the slot 21 and two holes 24 communicated with the passage 23.

The tubular seal 30 defines a hole 32.

The tubular lip 40 comprises a thread 42 formed on an internal face near a first end and a thread 44 formed on the internal face near a second end.

The control element 50 comprises a cam 52 and a lever 54 extending from the cam 52. The cam 52 includes a lobe.

The cam 52 is pivotally connected with the lugs 15 via a pin 70. The core 20 is put in the space 13. The head 22 contacts the cam 52. The O-ring 25 seals the first section of the space 13. Via the holes 24, the passage 23 is communicated with the first section of the space 13. The tubular seal 30 is fit in the second section of the space 13 and located around the second end of the core 20. The collar 16 is put around the second tubular portion of the housing 10 in a sealing and rotating manner. The thread 42 is engaged with the thread 14. The collar 16 and the tubular lip 40 pinch the annular flange 18. Thus, the collar 16 and the tubular lip 40 are put on the housing 10 rotationally.

Figure 4:
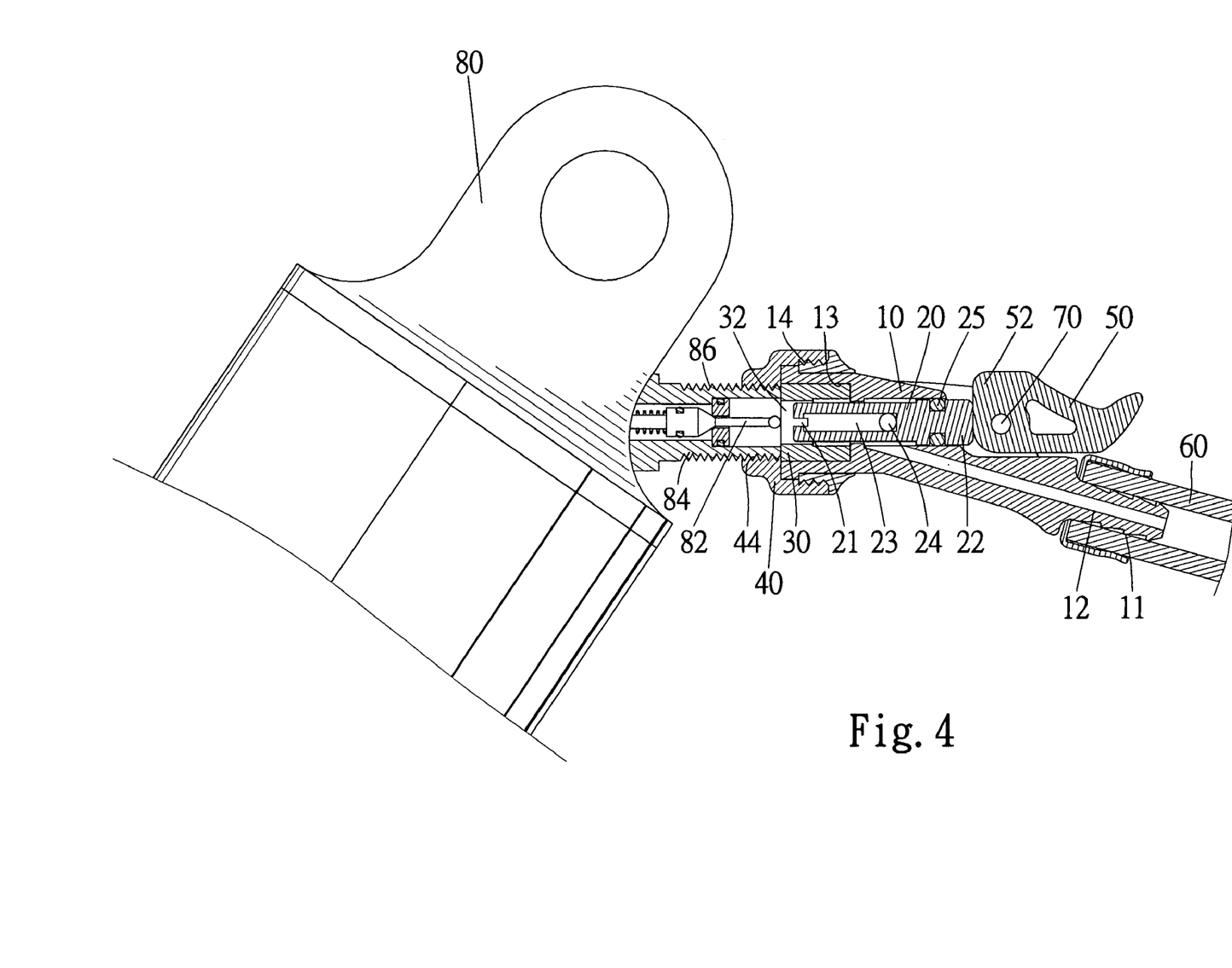
FIG. 4 is a cross-section of the nozzle of FIG. 1 engaged with a tube of a cushion.

Referring to FIG. 4, the cushion 80 includes a tube 84, a thread 86 formed on the tube 84 and a valve 82 put in the tube 84. The thread 44 is engaged with the thread 86 so as to connect the tubular lip 40 with the tube 84. The tubular seal 30 abuts the tube 84. The lever 54 lies on the first section of the housing 10.

Figure 5:
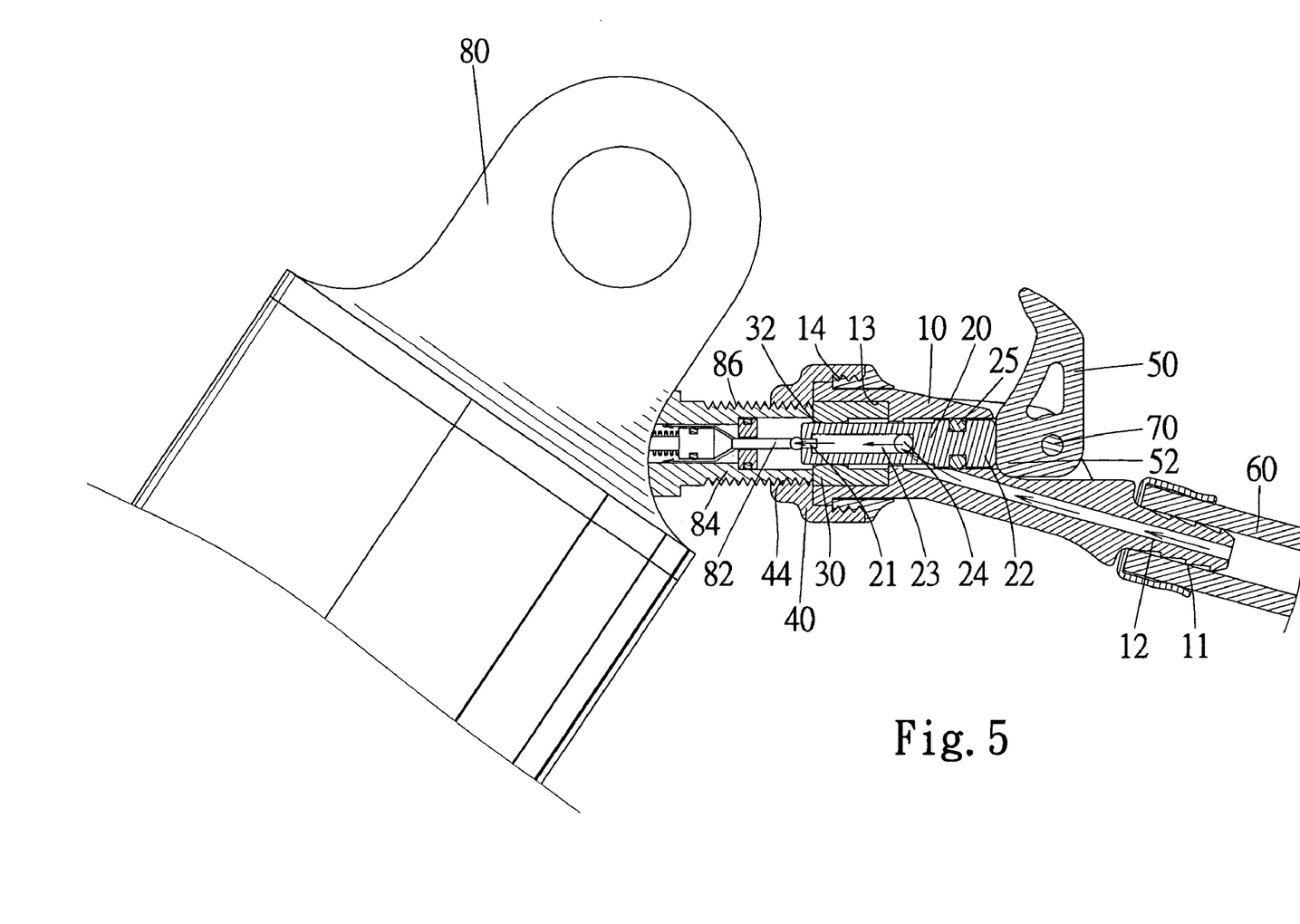
FIG. 5 is similar to FIG. 4 but shows the nozzle in an open position.

Referring to FIG. 5, the cam 52 is rotated via pivoting the lever 54. The head 22 is pushed via the lobe of the cam 52. The valve 82 is pushed by the core 20. Air flows through the tube 84. Only a little air flows from the cushion 80 before the pump is activated so as to pump air into the cushion 80.

Figure 6:
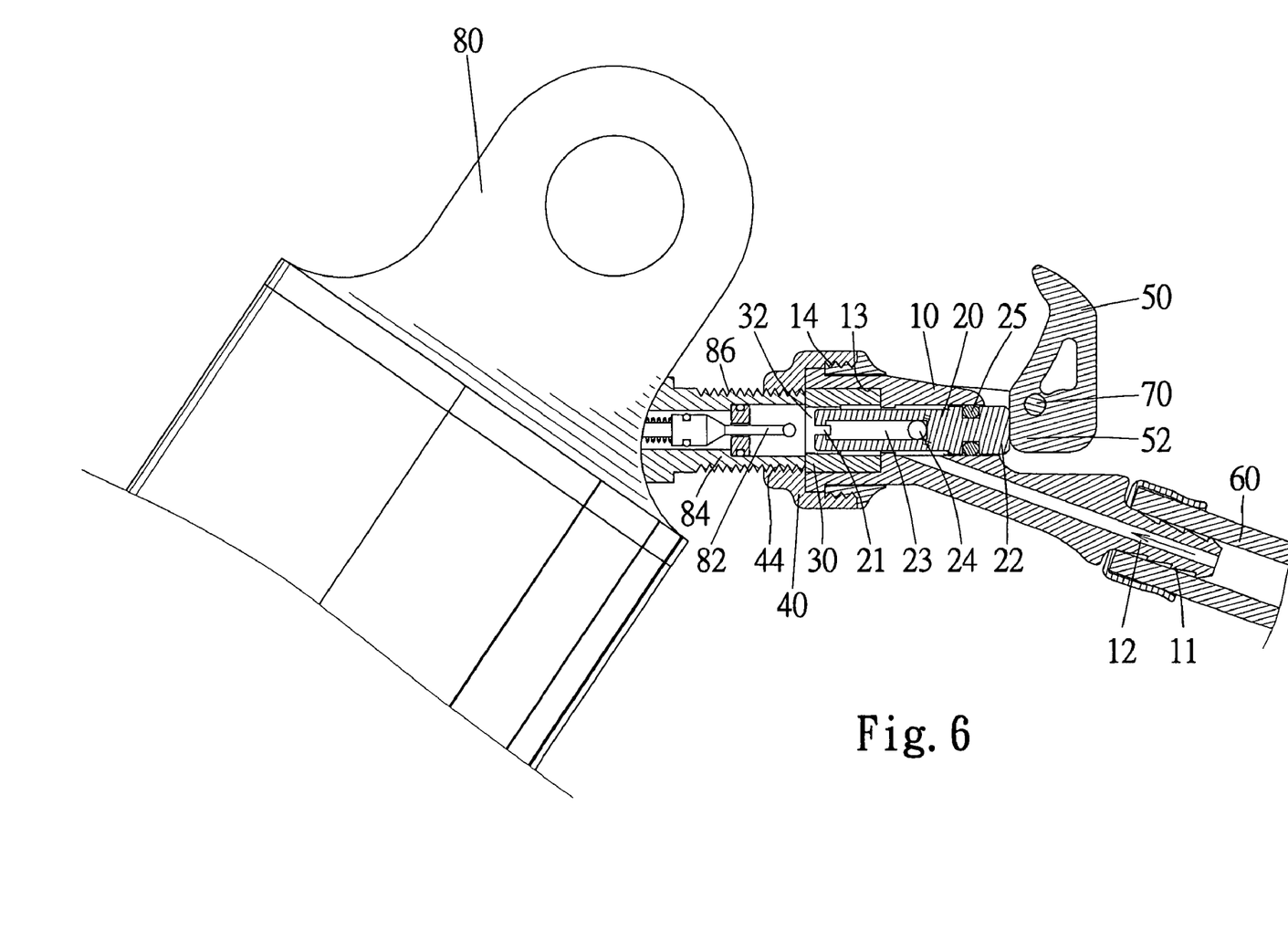
FIG. 6 is a cross-sectional view of a nozzle according to a second embodiment of the present invention.
Figure 7:
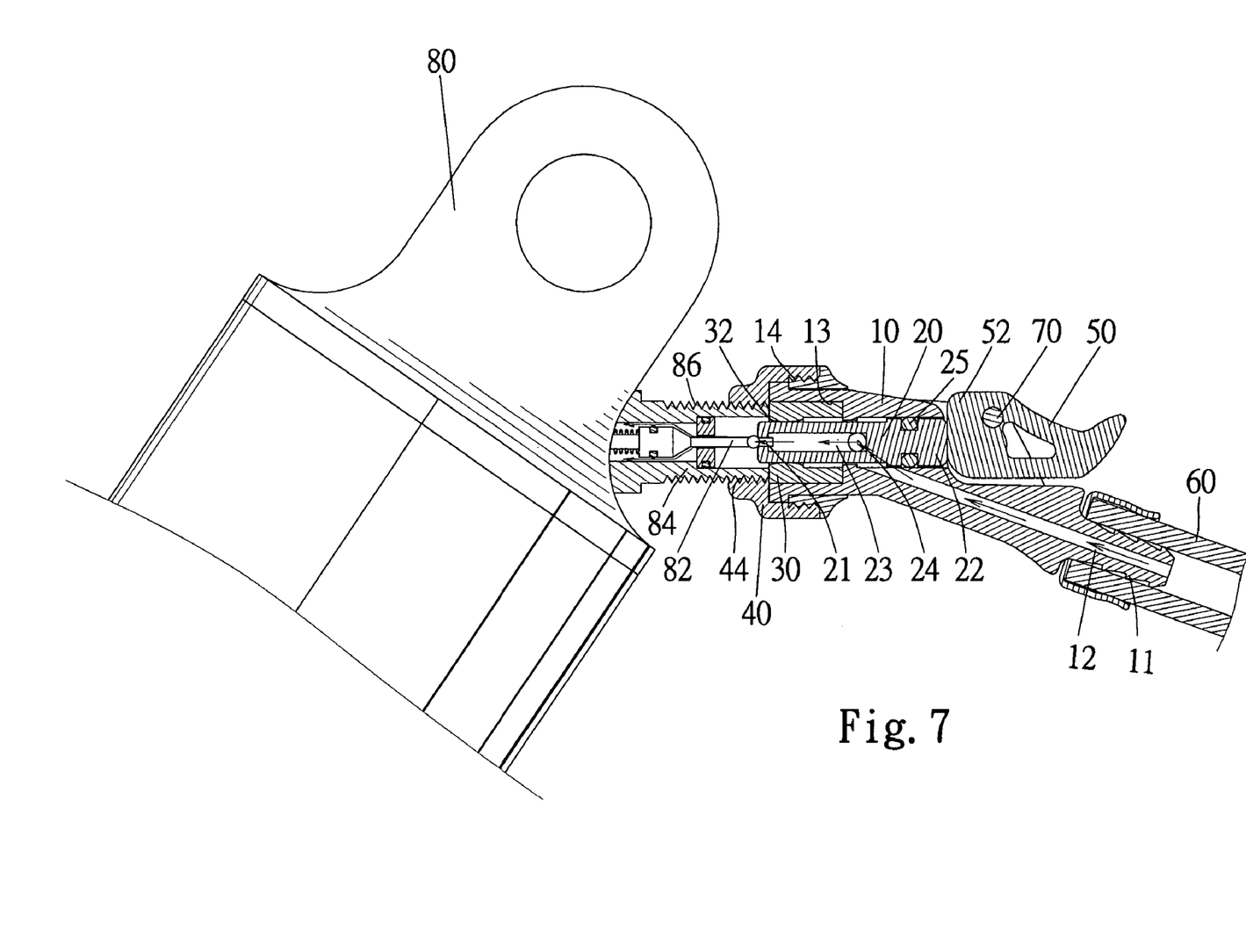
FIG. 7 is similar to FIG. 6 but shows the nozzle in an open position.

FIGS. 6 and 7 show a nozzle according to a second embodiment of the present invention. The second embodiment is identical to the first embodiment except that the lobe of the cam 52 is located differently so that the head 22 is pushed via the lobe of the cam 52 when the lever 54 lies on the first section of the housing 10.

The present invention exhibits some advantages. Firstly, it is operable easily since the pivotal movement of the lever 54 is easy. Secondly, it can save a lot of energy for pumping since only a little air flows from the cushion 80 before the pump is activated so as to pump air into the cushion 80.

The present invention has been described via detailed illustration of the embodiments. Those skilled in the art can derive variations from the embodiments without departing from the scope of the present invention. Therefore, the embodiments shall not limit the scope of the present invention defined in the claims.

The invention claimed is:

1. A nozzle through which air can be pumped into a cushion from a pump, the nozzle comprising:

a housing comprising a passage extending therein and a space intersecting the passage at a nonparallel angle of less than 90°;

a core put in the space in a sealing and sliding manner and including a first end and a second end, with the second end for pushing a valve installed in the cushion, wherein the core defines a passage extending from the second end towards but spaced from the first end, at least one peripheral hole via which the passage thereof is communicated with the space of the housing and a slot formed on the second end and communicated with the passage thereof, with the peripheral hole being within an extent of the passage of the housing;

a tubular lip installed on the housing in a sealing and rotating manner, wherein the tubular lip includes a tubular portion integrally formed as a single unseperable component with a neck portion, with the neck portion having an internal face and a thread formed on the internal face for engagement with a thread formed on the cushion;

a collar installed rotationally on the housing, wherein the collar includes a thread formed on an external face, wherein the tubular portion of the tubular lip includes a collar thread formed on the internal face for engagement with the thread of the collar, with the collar thread having a larger diameter than the thread formed on the internal face, wherein the housing includes an annular flange formed thereon and sandwiched between the collar and the tubular lip, with the collar threadably engaged with the tubular lip both rotatable on the housing for threadably engaging the thread formed on the internal face with the thread formed on the cushion, with the thread formed on the internal face aligned with and having a diameter smaller than the space of the housing;

a control element including a cam installed pivotally on the housing for pushing the core and a lever extending from the cam for rotating the cam; and a tubular seal fit in the space of the housing for abutting with the internal face of the tubular lip and therefore sealing the cushion, with the tubular seal including a hole, with the second end of the core moveably received in the hole of the tubular seal, with the tubular seal being sandwiched in the space of the housing during engagement of the collar thread of the tubular lip with the thread of the collar.

2. The nozzle according to claim 1 including a ring installed on the core for sealing the space of the housing.

3. The nozzle according to claim 2 wherein the ring is an O-ring.

4. The nozzle according to claim 2 wherein the ring is partially put in an annular groove extending in an external face of the core.

5. The nozzle according to claim 1 wherein the housing includes a joint for insertion in a pipe leading to the pump, wherein the passage extends through the joint.

6. The nozzle according to claim 1 wherein the housing includes two lugs formed thereon, wherein the cam is pivotally connected with the lugs.

7. The nozzle according to claim 6 including a pin for pivotally connecting the cam with the lugs.

8. The nozzle according to claim 1 wherein the core includes two peripheral holes.

* * * * *